Jan. 13, 1925.  1,523,106

C. DORNIER

SHEET METAL GIRDER

Filed June 28, 1920  2 Sheets-Sheet 1

Inventor:
Claudius Dornier.

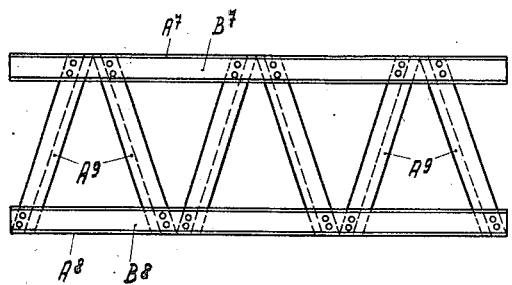
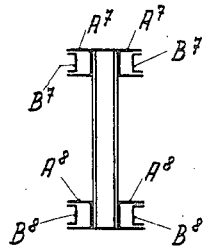
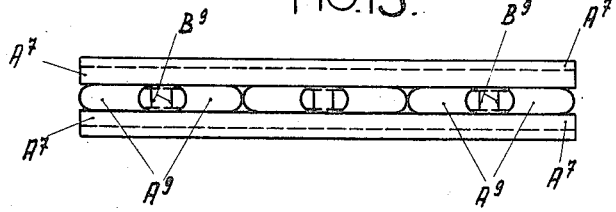

Patented Jan. 13, 1925.

1,523,106

UNITED STATES PATENT OFFICE.

CLAUDIUS DORNIER, OF FRIEDRICHSHAFEN, GERMANY.

SHEET-METAL GIRDER.

Application filed June 28, 1920. Serial No. 392,546.

(GRANTED UNDER THE PROVISIONS OF THE ACT OF MARCH 3, 1921, 41 STAT. L., 1313.)

*To all whom it may concern:*

Be it known that I, CLAUDIUS DORNIER, a citizen of the German Empire, residing at Friedrichshafen, Germany, have invented certain new and useful Improvements in Sheet-Metal Girder (for which I have filed application for patent in Germany, December 5, 1916, Patent No. 314,702), of which the following is a specification.

My invention refers to sheet metal girders and more especially to girders made of thin sheet metal such as steel, or duraluminium adapted for use in aircraft construction.

It is an object of my invention to provide a light sheet metal girder having higher mechanical strength than similar girders hitherto used.

With this object in view the novel girder according to my invention comprises compound members composed of two channels combined in such a manner as to form a hollow member possessing great mechanical strength at a given weight per longitudinal unit, at the same time offering special facilities for joining them with other members. Such compound members may form the flanges as well as the web members of the girder. By using channel members of simple section the material used in their construction may be kept very thin, the manufacture of the single parts being rendered thereby exceedingly easy and simple.

In accordance therewith two channels are combined in such a manner that one member is inserted in the other one with its middle web directed towards the middle web of the other so that the inner channel is left open, the flanges of the channels contacting with each other and being connected with each other by suitable means, preferably by riveting or welding. The flanges of the inner channel are preferably narrower than those of the "outer" channel embracing it. In other words the inner channel is shallower than the outer channel and by inserting the inner channel in the outer one in such a manner that their free edges are flush, a hollow space is enclosed between the two middle webs and the flanges of the outer rod.

The middle web or bottom of the channels may be even or curved and the flanges may extend at substantially right angles or obliquely thereto. I may however also employ channels of semi-circular or semi-elliptic or of some other suitable section, and the middle web or bottom of the inner rod may advantageously be bulged outwards or may be provided with indentures facilitating the introduction of rivets and riveting appliances in the case where cross-plates or the like shall be joined thereto, the edges of such indentures being preferably flanged or beaded in order to increase the mechanical strength. These compound channels are combined to form either only the flanges or also the web members of the composite girder forming the object of the present invention, care being preferably taken that the plane of symmetry of the single parts coincide with the middle plane of the girder.

In the drawings affixed to this specification and forming part thereof different kinds of compound members for use in the construction of sheet metal girders according to the present invention and a number of such girders are illustrated by way of example in a diagrammatical manner.

In the drawings—

Fig. 13 is a side elevation,

Fig. 14 a cross-section, and

Fig. 15, a plan of a double-flange lattice-girder constructed in accordance with the present invention.

Figure 3:
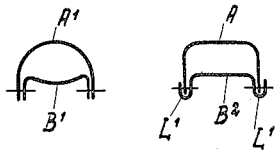
Figure 4:
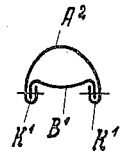
Figure 5:
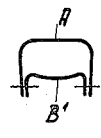
Figure 6:
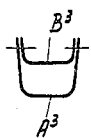
Figure 7:
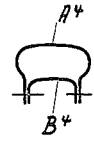

Referring to Figs. 1 to 7 of the drawings, A is the outer and B is the inner channel. K, K are the high flanges of channel A and L, L are the relatively low flanges of channel B, the flanges K and L contacting with each other over their entire length and being fixed to each other, for example by riveting. While in the form shown in Fig. 1 the members have a substantially rectangular section with the edges slightly rounded, the outer channel $A^1$ according to Fig. 2 has U-section and the shallow channel B¹ has its middle web bulged outwards. In the modification shown in Fig. 3 an outer channel A is combined with an inner channel B² having its flanges L¹ bent over the edges of the outer channel, whereas in Fig. 4 the semi-elliptic outer channel A² has its flanges K¹ turned inwards so as to embrace the edges of the flanges of the inner channel B¹. Fig. 5 shows the combination of a rectangular channel A and an inner channel B¹ with bulged middle web. Fig. 6 illustrates two channels A³, B³ with slightly diverging flanges. Fig. 7 represents a relatively broad outer channel A⁴ combined with a relatively narrow inner channel B⁴, the flanges of said outer channel being to this end drawn slightly inwards so as to contact with the flanges of the inner channel.

Figure 1:
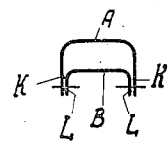
Figs. 1 to 7 are cross-sections of compound channels of different shape.
Figure 2:
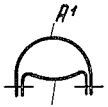

The sections illustrated in Fig. 2 and Fig. 4 are especially useful in the case where low air resistance and high mechanical strength are required. Where the middle web of the inner channel is bulged outwards (Figs. 2, 4, 5,) care must be taken that both flanges be still easily accessible from within. The flange connection shown in Figs. 3 and 4 is especially useful in case where electric welding is resorted to for connecting the parts or where the sheet metal employed is so thin that it would be difficult to connect to flat flanges by riveting.

Figure 8:
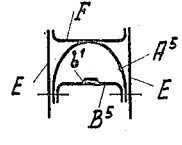
Fig. 8 is a similar view of a compound member and cross-plates fixed thereto at an assemblage point.

In the joint connection illustrated in Fig. 8 E, E are two cross-plates connected with the compound member A⁵, B⁵. An auxiliary channel F connected with the outer channel A⁵ further facilitates the connection to be established between the channel member and the plates, flanged indentures b¹ being provided in the middle web of the inner channel B⁵ in order to facilitate the channels A⁵ and F being riveted together. As the flanging contributes to stiffen the rod B⁵, I even prefer in some cases providing flanged indentures over the full length of the inner channel, thus reducing its weight without impairing its strength.

Figure 9:
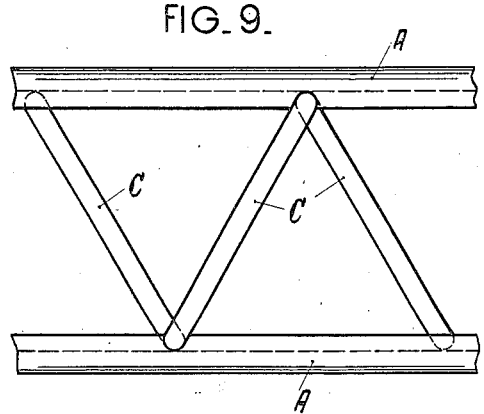
Figs. 9 and 11 are side elevations.
Figure 10:
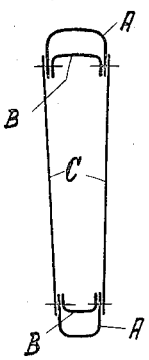
Figs. 10 and 12 are cross-sections of a lattice girder and a box girder, respectively.
Figure 11:
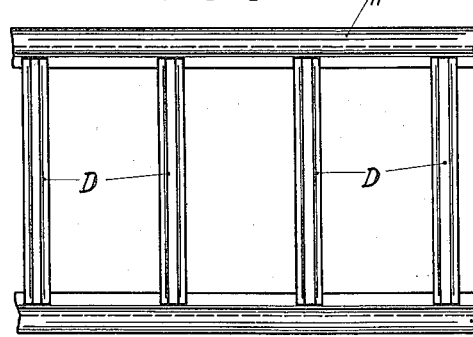
Figure 12:
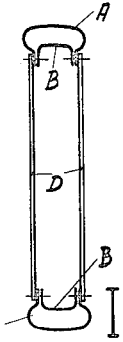

Compound members of trapezoidal section such as illustrated for instance in Fig. 6 are especially useful in constructing girders of the box-type, the said members serving as flanges. In the modification shown in Figs. 9 and 10, the web members C are relatively flat. In the case where it is desired to avoid the web members projecting laterally, I prefer employing flanges constructed in accordance with Fig. 7, the breadth of which exceeds that of the framework formed by web members D, although these latter may be relatively broad. A girder constructed on these lines and shown in Figs. 11 and 12 can be covered with fabric all over without any projecting edges or points being able to injure the fabric. In consequence thereof girders of this kind are of special value in the construction of airships and aeroplanes.

In the double-flange girder illustrated in Figs 13 to 15 two pairs of flangs A⁷, B⁷ and A⁸, B⁸ are connected by a single row of web members A⁹, B⁹, all of equal section, the ends of the web members being inserted between the flange members of the upper and lower pairs, respectively, thus forming together with the flanges a girder of substantially double-T section. The outer members of the upper and lower flanges are fixed by riveting to the web members, the planes of symmetry of the flanges thus extending vertically to those of the web members. This construction permits of fastening to it cover plates or other constructive members in a specially simple manner.

I generally prefer employing outer and inner channels of like material, thin sheet steel or light sheet metal being especially useful. I may however employ also wood or certain artificial materials, and in this case I prefer increasing the specific mechanical resistance of such materials by reinforcing them with metal. My invention is further applicable with advantage in cases where it is impossible, owing to certain material lacking or for other reasons, to employ material of uniform character. Low weight and high rigidity in combination with uniform outer section is best obtained in such cases by combining outer rods of thin high grade sheet metal with inner rods of thicker though somewhat less resistive material.

I wish it to be understood that I do not desire to be limited to the exact details of construction shown and described, for obvious modifications will occur to a person skilled in the art.

I claim:—

1. A sheet metal girder comprising in combination, a pair of outer channels forming the flanges, an inner channel inserted in and fixed to each outer channel with a clearance between their middle webs, and web members connecting said outer channels.

2. A sheet metal girder comprising in combination, a pair of outer channels forming the flanges, an inner channel inserted in and fixed to each outer channel with a clearance between their middle webs, and channeled web members connecting said outer channels.

3. A sheet metal girder comprising in combination, a pair of outer channels forming the flanges, an inner channel inserted in and fixed to each outer channel with a clearance between their middle webs, and web members extending alternately on one and the other side of said outer channels.

4. A sheet metal girder comprising in combination, a pair of outer channels forming the flanges, an inner channel inserted in and fixed to each outer channel with a clearance between their middle webs, and web members connecting said outer channels, each web member comprising an outer and an inner channel fixed to one another.

5. A sheet metal girder comprising in combination, two outer channels with their middle webs facing each other and an inner channel inserted in and fixed to each outer channel forming each flange, and web members, each comprising an outer and an inner channel, connecting the flanges.

In testimony I affix my signature.

CLAUDIUS DORNIER.